United States Patent
Mochizuki

(10) Patent No.: US 7,876,485 B2
(45) Date of Patent: Jan. 25, 2011

(54) LIGHT SCANNING UNIT AND IMAGE FORMING APPARATUS USING THE SAME

(75) Inventor: Takeshi Mochizuki, Hitachinaka (JP)

(73) Assignee: Ricoh Company, Ltd., Tokyo (JP)

( * ) Notice: Subject to any disclaimer, the term of this patent is extended or adjusted under 35 U.S.C. 154(b) by 538 days.

(21) Appl. No.: 12/028,634

(22) Filed: Feb. 8, 2008

(65) Prior Publication Data

US 2008/0192320 A1 Aug. 14, 2008

(30) Foreign Application Priority Data

Feb. 9, 2007 (JP) ............................. 2007-030623
Jan. 30, 2008 (JP) ............................. 2008-019445

(51) Int. Cl.
  *G02B 26/08* (2006.01)
(52) U.S. Cl. .................. 359/204.1; 359/201.1; 347/232
(58) Field of Classification Search ... 359/196.1–226.2; 347/232–239, 241–244
See application file for complete search history.

(56) References Cited

U.S. PATENT DOCUMENTS 7,110,016 B2* 9/2006 Suzuki et al. ............... 347/233
7,145,589 B2* 12/2006 Amada et al. ............... 347/241
7,746,527 B2* 6/2010 Takeda .................... 359/202.1

FOREIGN PATENT DOCUMENTS

| JP | 59-116715 A | 7/1984 |
|---|---|---|
| JP | 5-313089 A | 11/1993 |
| JP | 7-72402 A | 3/1995 |
| JP | 7-244251 A | 9/1995 |
| JP | 8-35937 A | 2/1996 |

* cited by examiner

*Primary Examiner*—James Phan
(74) *Attorney, Agent, or Firm*—Crowell & Moring LLP

(57) ABSTRACT

A light scanning unit by which misalignment in imaging caused by a scanning angle can be reduced. The light scanning unit includes a light source array device having a plurality of light sources, an imaging optics, and an optical deflection module. The plurality of light sources are used selectively in accordance with positions of light beams in a scanning direction on a to-be-scanned surface.

7 Claims, 4 Drawing Sheets

LIGHT SCANNING UNIT AND IMAGE FORMING APPARATUS USING THE SAME

FIELD OF THE INVENTION

The present invention relates to a light scanning unit for use in an image forming apparatus, and particularly relates to a post-objective type light scanning unit using a plurality of light beams.

BACKGROUND OF THE INVENTION

Pre-objective type light scanning units prevail as light scanning units for use in laser printers etc. In a pre-objective type light scanning unit, a scanning lens such as an Fθ lens is disposed in a stage subsequent to an optical deflection module such as a rotary polygon mirror. There is a problem that the size of the lens is large enough to complicate the configuration of the light scanning unit and increase the cost thereof.

In contrast, post-objective type light scanning units are expected as a solution for the aforementioned problem because a scanning lens is not disposed in a stage subsequent to an optical deflection module. However, in the post-objective type light scanning units, misalignment in imaging may occur due to a variation in a distance between the optical deflection module and a to-be-scanned surface in accordance with an angle of deflection of a light beam by the optical deflection module, that is, a scanning angle. It is therefore necessary to provide a means for correcting the misalignment.

According to JP-A-5-313089, a rotary polygon mirror is used as an optical deflector, and a reflective surface thereof is made aspherical enough to correct the curvature of field in a direction to which a light beam is deflected for scanning (hereinafter referred to as "main-scanning direction"). In addition, the refractive power of a correcting lens which is disposed between the optical deflector and a to-be-scanned surface is varied from its center to its periphery in a direction perpendicular to the main-scanning direction (hereinafter referred to as "sub-scanning direction") so as to correct the curvature of field in the sub-scanning direction. It is, however, difficult to control the quality with which the aspherical reflective surface is manufactured. It is also troublesome that the correcting lens may have a large size in the main-scanning direction.

According to JP-A-7-72402, a range from a central portion to a peripheral portion can be placed within an allowable depth by use of a Bessel beam which is characterized by having a very deep focal depth. This method requires a Bessel beam generating module such as a conical lens. Thus the cost increases. In addition, there occurs a phenomenon that a secondary beam with a comparatively high intensity appears around a main beam. This phenomenon may cause a problem in a system having a high developability.

According to JP-A-7-244251, a reflective surface of a polygon mirror is formed into a flat shape, and a concave aspherical transparent member is provided in tight contact with the reflective surface so as to correct a curvature of field. There are conceivable problems as follows. That is, the manufacturing cost of the polygon mirror increases. In addition, it is difficult to control the profile irregularity of the aspherical transparent member and to control the uniformity of its internal refractive index.

According to JP-A-8-35937, a set of lenses are moved in an optical axis so as to correct a curvature of field. It is, however, believed that it is difficult in view of speed of response to move the lenses synchronously in scanning units.

According to JP-A-59-116715, a plurality of light sources are installed so that their optical axes are matched with one another by half mirrors. One of the light sources is selected in accordance with an angle of deflection of a light beam, that is, a scanning angle. Here, a plurality of half mirrors are used when 3 or more light sources are used. Accordingly, when a plurality of independent light sources are used, the light sources may change their positions relative to a common lens independently of one another. Thus, relative misalignment may occur among scanning lines on a to-be-scanned surface.

Each half mirror transmits one of light beams and reflects the other. When the surface of the half mirror is inclined, a deflection angle twice as large as the inclination of the surface may be produced in the reflected beam though there is no change in the deflection angle of the transmitted beam. Particularly when a light source forming a scanning line is switched to another to form another scanning line, there arises a problem that discontinuity between the scanning lines can be recognized in the portion where the light source is switched. Further, in a system using a plurality of half mirrors, which is described as means using three or more light sources, the aforementioned misalignment is doubled. The system is not practical.

Patent Document 1: JP-A-5-313089
Patent Document 2: JP-A-7-072402
Patent Document 3: JP-A-7-244251
Patent Document 4: JP-A-8-035937
Patent Document 5: JP-A-59-116715

SUMMARY OF THE INVENTION

An object of the present invention is to provide a post-objective type light scanning unit in which misalignment in imaging due to a scanning angle can be reduced with a simple configuration using no especially novel optical elements, and an image forming apparatus using the light scanning unit.

In order to attain the foregoing object, a first configuration of the present invention provides a light scanning unit including:

a light source array device in which a plurality of light sources are arrayed;

an imaging optics for converging light beams emitted from the light source array device; and a light deflection module for deflecting the light beams transmitted by the imaging optics so as to scan a to-be-scanned surface with the deflected light beams;

wherein the plurality of light sources are placed in a flat plane where the light beams are deflected and the to-be-scanned surface is scanned with the light beams, and the plurality of light sources are used selectively in accordance with scanning-direction positions of the light beams in the to-be-scanned surface.

According to a second configuration of the present invention, the light scanning unit according to the first configuration is characterized in that a plane which is perpendicular to an optical axis of the imaging optics and in which the plurality of light sources are placed is different from a front conjugate plane which is conjugate to the to-be-scanned surface with respect to the imaging optics.

According to a third configuration of the present invention, the light scanning unit according to the second configuration is characterized in that the front conjugate plane is curved.

According to a fourth configuration of the present invention, the light scanning unit according to any one of the first to third configurations is characterized in that a relation expressed by Expression (1) is established between a distance $\delta_0$ between the light sources and the front conjugate plane at a scanning angle $\theta_0$ providing a scanning position $h_0$ on the to-be-scanned surface and a distance $\delta$ between the light sources and the front conjugate plane at a scanning angle $\theta$ providing a scanning position $\underline{h}$ when M designates a conjugate magnification on the optical axis of the imaging optics, $\underline{a}$ designates a distance between the imaging optics and the plane which is perpendicular to the optical axis of the imaging optics and in which the plurality of light sources are placed, and $\underline{d}$ designates a distance between the imaging optics and the optical deflection module:

$$M^2(\delta-\delta_0)=(Ma-d)(\cos\theta-\cos\theta_0) \quad (1)$$

According to a fifth configuration of the present invention, the light scanning unit according to any one of the first to fourth configurations is characterized in that a number of the light sources of the light source array device is at least 3.

A sixth configuration of the present invention provides an image forming apparatus including a photoconductor, a charging unit for charging a surface of the photoconductor, a light scanning unit for irradiating the charged surface of the photoconductor with a light beam so as to form an electrostatic latent image on the photoconductor, a developing unit for developing the electrostatic latent image with toner so as to form a toner image, and a transfer unit for transferring the formed toner image onto a recording medium, wherein the light scanning unit is a light scanning unit according to any one of Claims 1 through 5.

According to a seventh configuration of the present invention, the image forming apparatus according to the sixth configuration is characterized in that a plurality of printing units each having the photoconductor, the charging unit, the light scanning unit and the developing unit are provided, and a plurality of color toner images formed by the printing units respectively are transferred on top of one another on the recording medium.

According to the present invention configured thus, misalignment in imaging due to an image plane curved in an arc in accordance with a scanning angle can be suppressed effectively with a simple configuration using no especially novel optical element.

Particularly due to the light source array device by which a plurality of light beams can pass through common optical elements such as lenses, mirrors, etc., positional misalignment in scanning a to-be-scanned surface with the plurality of light beams can be suppressed and reduced. Scanning lines with high continuity can be obtained even if the scanning lines are formed by selected ones of the light sources. Particularly when the number of light sources of the light source array device is 3 or more, the aforementioned positional misalignment and the deterioration of continuity appear conspicuously in accordance with increase of the number of the light sources in the background art. According to the present invention, however, the aforementioned positional misalignment or the deterioration of continuity can be prevented even if the number of light sources increases. Thus, the increase of the number of light sources can have a direct effect.

DETAILED DESCRIPTION OF THE EMBODIMENTS

Figure 1:
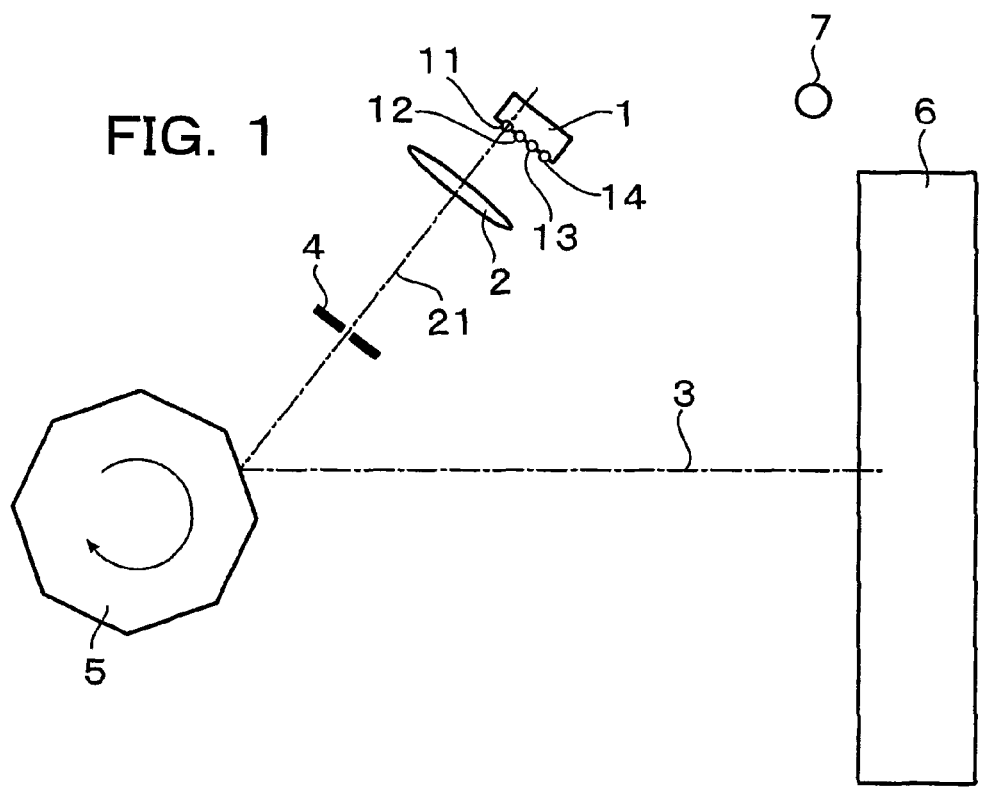
FIG. 1 is a schematic configuration view of a light scanning unit according to an embodiment of the present invention.

Next, embodiments of the present invention will be described with reference to the drawings. FIG. 1 is a schematic configuration view of a light scanning unit according to an embodiment of the present invention. In FIG. 1, the reference numeral 1 represents a light source array device; 2, an imaging optics; 21, an optical axis of the imaging optics; and 4, an aperture member. The imaging optics 2 consists of an aspherical single lens having positive power and rotational symmetries. The reference numeral 3 represents a reference line of a scanning angle $\theta$. Light sources 11-14 are arrayed on the light source array device 1. The light sources 11-14 are placed in a flat plane perpendicular to the optical axis 21 of the imaging optics 2 and in a scanning flat plane. An optical deflection module 5 is composed of a rotary polygon mirror. A to-be-scanned surface 6 is a peripheral surface of a photoconductor drum or the like. An optical sensor 7 is placed near the to-be-scanned surface 6.

Figure 2:
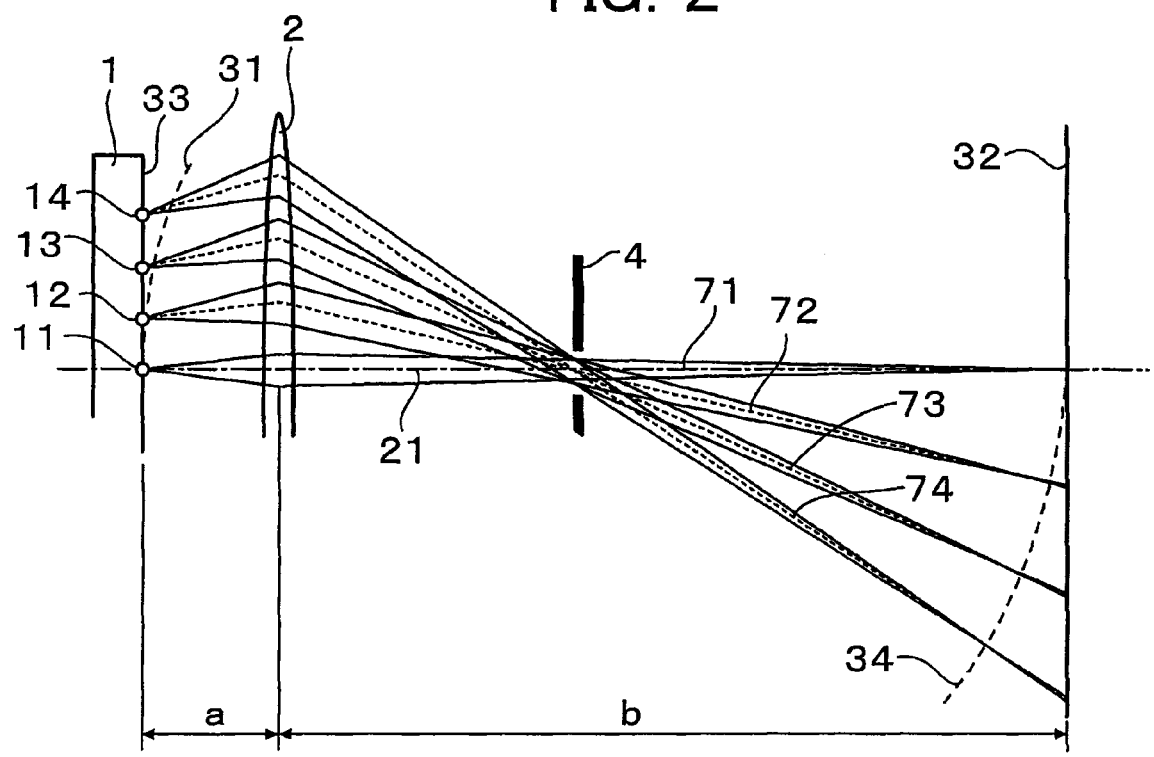
FIG. 2 is a view showing the layout of a finite conjugate system composed of light sources and an imaging optics in the light scanning unit according to the embodiment of the present invention.

FIG. 2 is a view showing the layout of a finite conjugate system composed of the light sources and the imaging optics in the light scanning unit. In FIG. 2, the reference numeral 1 represents a light source array device; 2, an imaging optics; 21, an optical axis of the imaging optics; and 4, an aperture member. The light source array device 1 includes light sources 11-14, which are placed in a plane 33. The plane 33 is located in a flat plane perpendicular to the optical axis 21 of the imaging optics 2 and in a scanning flat plane. The number of the light sources is four in FIG. 2 by way of example. When about 10-20 light sources are further placed, a system with less misalignment in an image plane can be constructed.

The reference numerals 31 and 32 represent a front conjugate plane and a rear conjugate plane with respect to the imaging optics 2. The rear conjugate plane 32 is a flat plane perpendicular to the optical axis 21. The front conjugate plane 31 is a plane curved due to the curvature of field belonging to the imaging optics 2. Assume that the front and rear conjugate planes 31 and 32 are located at distances $\underline{a}$ and $\underline{b}$ from the imaging optics 2 on the optical axis respectively, and the conjugate magnification on the optical axis is M. Regard the imaging optics 2 as a thin lens, and regard the distance between two principal points as negligible.

The light source 11 is located on the front conjugate plane 31, and the light sources 12-14 are located farther from the imaging optics 2 than the front conjugate plane 31. Light beams 71-74 are emitted from the light sources 11-14 respectively. The light beam 71 emitted from the front conjugate plane 31 is focused on the rear conjugate plane 32 by the imaging optics 2. On the other hand, each light beam 72-74 is focused more closely to the imaging optics 2 than the rear conjugate plane 32. A plane 34 curved on the imaging optics 2 side is formed when the focal points obtained thus are connected. That is, the plane 34 is a conjugate plane to the plane 33.

Figure 3:
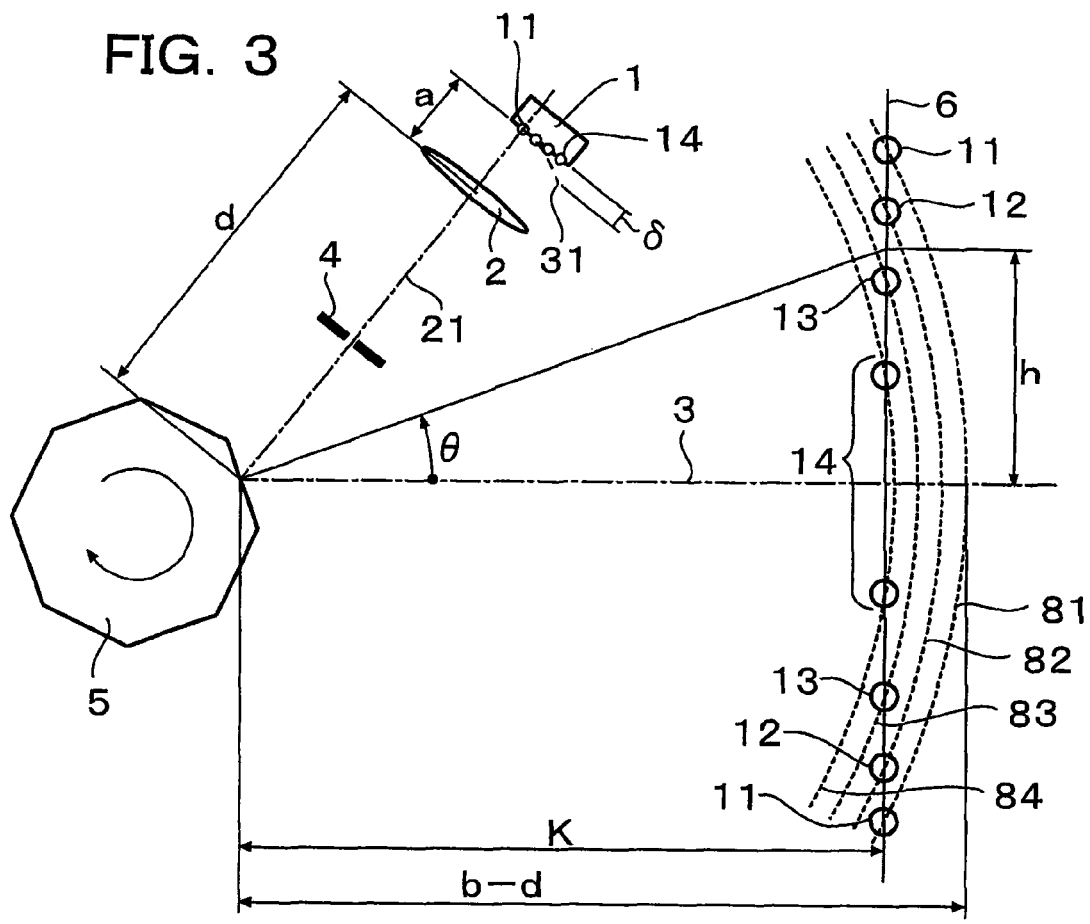
FIG. 3 is a schematic configuration view showing a fundamental configuration of a post-objective type light scanning unit.

FIG. 3 is a schematic configuration view showing a fundamental configuration of a post-objective type light scanning unit. In FIG. 3, the reference numeral 5 represents an optical reflection module composed of a rotary polygon mirror; 6, a to-be-scanned surface; and 3, a reference line of a scanning angle θ, that is, a line showing the traveling direction of a beam when the scanning angle θ is 0. The reference numerals 81-84 represent trajectories followed by image positions in accordance with a change of the scanning angle (image positions).

As described with reference to FIG. 2, the light beams 71-74 which have been transmitted by the imaging optics 2 are focused in different degrees. Thus, the image positions 81-84 draw arcs around a reflective surface of the optical deflection module 5 and with different radii from one another. In fact, translation within the scanning plane occurs in each light beam due to the movement of a reflective point caused by the rotation of the optical deflection module 5. However, the concept of the translation will be omitted in the description of FIG. 3.

Assume that K designates a distance between the optical deflection module 5 and the to-be-scanned surface 6, that is, a scanning coefficient on the axis in the post-objective type scanning optics, θ designates a scanning angle of a light beam by the optical deflection module 5, and $h$ designates a scanning position on the to-be-scanned surface 6. In this case, the following Expression (2) is established.

$$h = K \tan \theta \quad (2)$$

Assume that $\delta_0$ designates a distance between the light sources and the front conjugate plane at a scanning angle $\theta_0$ providing a scanning position $h_0$ on the to-be-scanned surface, δ designates a distance between the light sources and the front conjugate plane at a scanning angle θ providing a scanning position $h$, M designates a conjugate magnification on the optical axis of the imaging optics, $a$ designates a distance between the imaging optics and the plane which is perpendicular to the optical axis of the imaging optics and in which the plurality of light sources are placed, and $d$ designates a distance between the imaging optics and the optical deflection module. In this case, the following Expression (1) can be obtained as an imaging condition.

$$M^2(\delta - \delta_0) = (Ma - d)(\cos \theta - \cos \theta_0) \quad (1)$$

A conjugate relation is established between the light sources and the to-be-scanned surface under the condition satisfying the distance δ obtained from Expression (1) at any angle θ providing a suitable position $h$ in Expression (2). Under this condition, it is possible to obtain a post-objective type light scanning unit in which misalignment in imaging can be prevented.

In fact, when the light sources arrayed discretely are used selectively, a continuous variation of the distance δ cannot be obtained for the distance $h$ and the angle θ which vary continuously. However, estrangement from Expression (1) can be allowed as allowable imaging misalignment which should be allowed within a range of focal depth. A suitable way of selecting one of the light sources depends on the constants M, $a$ and $b$ in Expression (1), the arrangement of the light sources in the light source array device, and the curvature of field of the imaging optics. This means that selecting the light sources can be determined in the stage where the specification and configuration of the light scanning unit have been determined.

Tables 1 and 2 show dimensions. In Table 1, the surface sign a designates the light source surface, the surface signs $b$ and $c$ designate the refractive surfaces of the imaging optics 2, the surface sign $d$ designates the aperture, the surface sign $e$ designates the reflective surface of the rotary polygon mirror, and the surface sign $f$ designates the to-be-scanned surface of a photoconductor drum. The dimensions are normalized by the scanning coefficient K shown in Expression (2). In Table 2, the beam incident angle designates the angle between the optical axis 21 of the imaging optics 2 and the reference line 3 of the scanning angle θ.

TABLE 1

| SURFACE SIGN | CURVATURE RADIUS | CONICAL CONSTANT | INTERPLANAR DISTANCE | REFRACTIVE INDEX |
|---|---|---|---|---|
| A | ∞ | 0 | $1.97 \times 10^{-2}$ | 1.0 |
| B | $-2.32 \times 10^{-1}$ | 0 | $4.27 \times 10^{-3}$ | 1.768 |
| C | $-1.58 \times 10^{-2}$ | −0.561 | $1.33 \times 10^{-2}$ | 1.0 |
| D | ∞ | 0 | $1.07 \times 10^{-1}$ | 1.0 |
| E | ∞ | 0 | 1.0 | 1.0 |
| F | ∞ | 0 | — | 1.0 |

TABLE 2

| ROTARY POLYGON MIRROR | NUMBER OF SURFACES | 8 |
|---|---|---|
| | INRADIUS | $4.53 \times 10^{-2}$ |
| | BEAM INCIDENT ANGLE | 0.87 rad |
| LIGHT SOURCE ARRAY DEVICE | NUMBER OF LIGHT SOURCES | 4 |
| | LIGHT SOURCE INTERVAL | $2.93 \times 10^{-4}$ |

Figure 4:
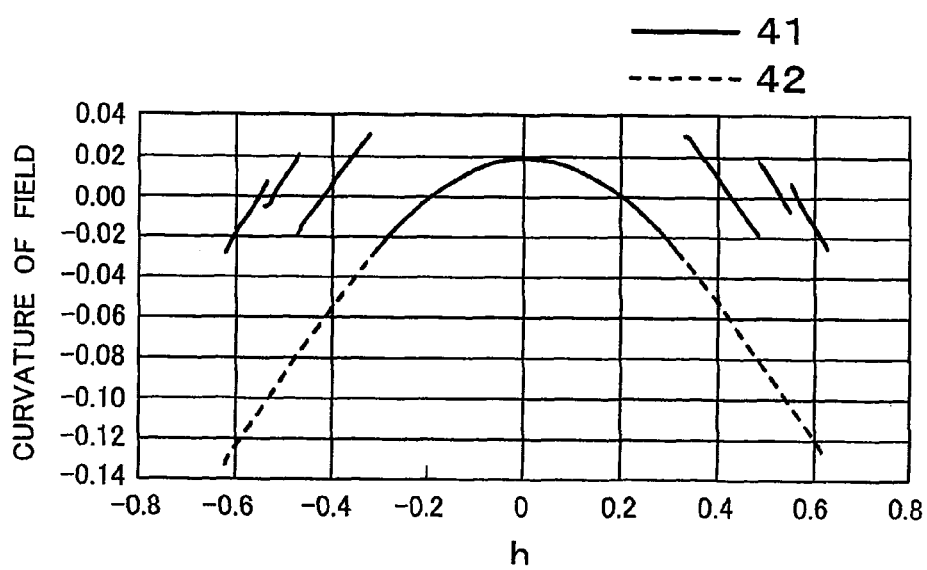
FIG. 4 is a graph showing the relationship between a scanning position and a field curvature in the light scanning unit according to the embodiment of the present invention.

FIG. 4 shows the relationship between the scanning position h and the positional misalignment in imaging, that is, the curvature of field. The dimensions are normalized by the scanning coefficient K on the axis shown in Expression (2). The reference numeral 42 represents a case where a single light source was used all over the scanning angles. The reference numeral 41 represents a case where the four light sources 11-14 were switched sequentially and used selectively in accordance with the position $h$ in the main-scanning direction. The effect of suppressing the curvature of field can be confirmed. According to this selective use, the light source 11, the light source 12, the light source 13, the light source 14, the light source 13, the light source 12 and the light source 11 are used selectively in this order on the to-be-scanned surface 6 as shown in FIG. 3.

Figure 5:
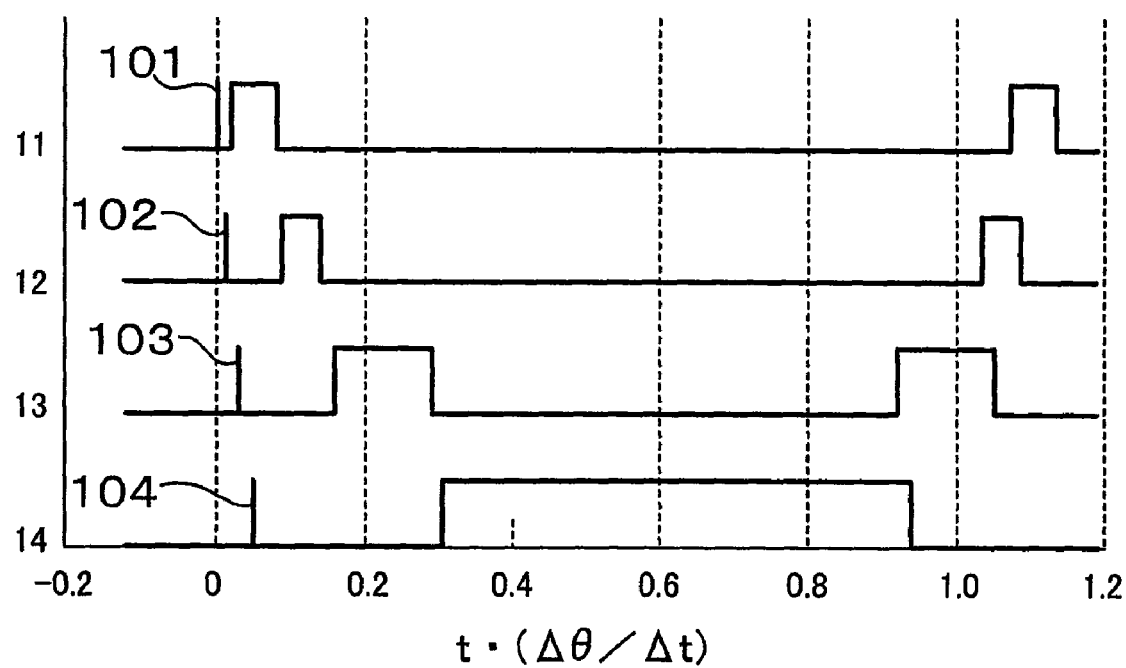
FIG. 5 is a time chart showing on/off control of each light source in the light scanning unit according to the embodiment of the present invention.

FIG. 5 shows a time chart of on/off control of the light sources 11-14. The abscissa in FIG. 5 designates a value obtained by multiplying time t by an angular velocity Δθ/Δt (rad/unit time) of the scanning angle θ. In FIG. 5, the reference numerals 101-104 represent signals for detecting timing, and the signal 101 is regarded as issued at time t=0. The signals 101-104 for detecting timing are outputted from the optical sensor 7 installed near the to-be-scanned surface 6 as shown in FIG. 1.

As shown in FIG. 5, the light sources 11-14 are on/off-controlled based on the signals 101-104 for detecting timing, respectively. That is, the positions of writing with the plurality of beams are set using the signals for detecting timing, respectively.

Techniques for setting the positions of writing with a plurality of beams in such a manner have been disclosed in detail, for example, in JP-A-8-164632, JP-A-2000-352677, JP-A-2002-48988, etc. Those techniques can be applied.

The known techniques can be also applied to correction of the translation of each light beam in the scanning flat plane due to the movement of the reflective point caused by the rotation of the rotary polygon mirror as described previously.

Figure 6:
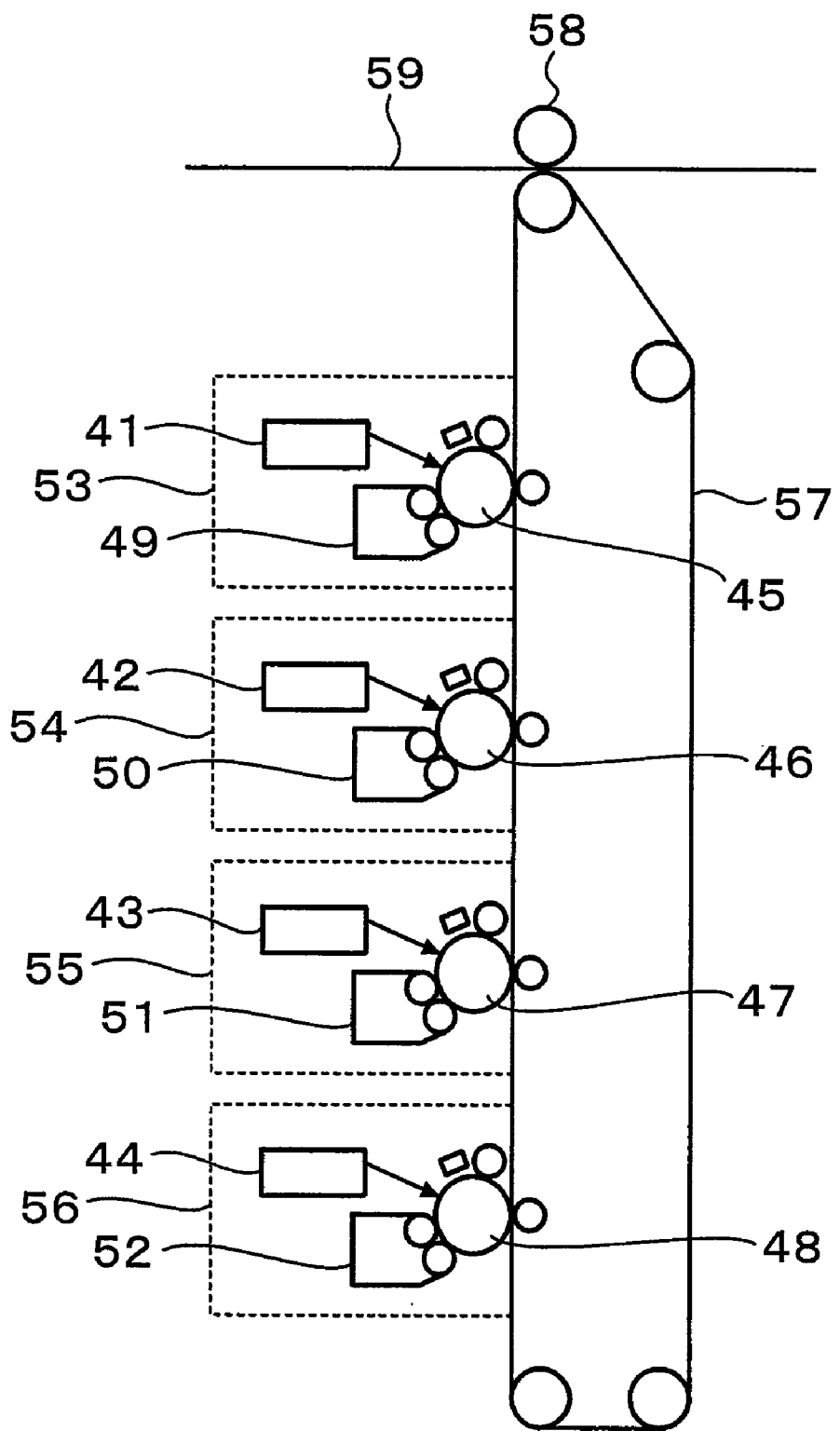
FIG. 6 is a schematic configuration view of a multi-color image forming apparatus according to an embodiment of the present invention.

FIG. 6 is a schematic configuration view of a multi-color image forming apparatus using a plurality of such post-objective type scanning units. In FIG. 6, the reference numerals 41-44 represent post-objective type light scanning units; 45-48, photoconductor drums; 49-52, developing units; and 53-56, printing units constituted by these units. The printing units 53-56 are disposed vertically (in the up/down direction) as shown in FIG. 6. The printing units 53-56 support a plurality of colors, for example, cyan, magenta, yellow and black respectively.

Toner images formed on the photoconductor drums 45-48 of the printing units 53-56 respectively are transferred onto a belt-like intermediate transferor 57 so as to be superimposed on one another. A multi-color toner image formed thus is further transferred onto recording paper 59 by a transfer unit 58. Thus, a multi-color image (color image) is formed.

In this embodiment, description has been made about a multi-color image forming apparatus using a plurality of light scanning units. However, the present invention is not limited to this, but it can be also applied to an image forming apparatus using a single light scanning unit.

What is claimed is:

1. A light scanning unit comprising:
   a light source array device in which a plurality of light sources are arrayed;
   an imaging optics for converging light beams emitted from the light source array device; and
   a light deflection module for deflecting the light beams transmitted by the imaging optics so as to scan a to-be-scanned surface with the deflected light beams;
   wherein the plurality of light sources are placed in a flat plane where the light beams are deflected and the to-be-scanned surface is scanned with the light beams, and the plurality of light sources are used selectively in accordance with scanning-direction positions of the light beams in the to-be-scanned surface.

2. A light scanning unit according to claim 1, wherein a plane which is perpendicular to an optical axis of the imaging optics and in which the plurality of light sources are placed is different from a front conjugate plane which is conjugate to the to-be-scanned surface with respect to the imaging optics.

3. A light scanning unit according to claim 2, wherein the front conjugate plane is curved.

4. A light scanning unit according to claim 1, wherein a relation expressed by Expression (1) is established between a distance $\delta_0$ between the light sources and the front conjugate plane at a scanning angle $\theta_0$ providing a scanning position $h_0$ on the to-be-scanned surface and a distance $\delta$ between the light sources and the front conjugate plane at a scanning angle $\theta$ providing a scanning position $\underline{h}$ when M designates a conjugate magnification on the optical axis of the imaging optics, $\underline{a}$ designates a distance between the imaging optics and the plane which is perpendicular to the optical axis of the imaging optics and in which the plurality of light sources are placed, and $\underline{d}$ designates a distance between the imaging optics and the optical deflection module:

$$M^2(\delta-\delta_0)=(Ma-d)(\cos\theta-\cos\theta_0) \qquad (1).$$

5. A light scanning unit according to claim 1, wherein a number of the light sources of the light source array device is at least 3.

6. An image forming apparatus comprising:
   a photoconductor;
   a charging unit for charging a surface of the photoconductor;
   a light scanning unit for irradiating the charged surface of the photoconductor with a light beam so as to form an electrostatic latent image on the photoconductor;
   a developing unit for developing the electrostatic latent image with toner so as to form a toner image; and
   a transfer unit for transferring the formed toner image onto a recording medium;
   wherein the light scanning unit is a light scanning unit according to claim 1.

7. An image forming apparatus according to claim 6, wherein a plurality of printing units each having the photoconductor, the charging unit, the light scanning unit and the developing unit are provided, and a plurality of color toner images formed by the printing units respectively are transferred on top of one another on the recording medium.

* * * * *